INVENTOR.
Richard J. Lee
BY
ATTORNEY

United States Patent Office 3,480,168
Patented Nov. 25, 1969

3,480,168
THERMOPLASTIC PRESSURE VESSEL FOR CARBONATED BEVERAGES
Richard J. Lee, Midland, Mich., assignor to The Dow Chemical Company, Midland, Mich., a corporation of Delaware
Filed Dec. 26, 1967, Ser. No. 693,266
Int. Cl. B65d 11/04, 11/26
U.S. Cl. 215—1                                    9 Claims

ABSTRACT OF THE DISCLOSURE

A thermoplastic pressure vessel or bottle for carbonated beverages which would be subject only to a minimum of distortion due to the relatively high internal pressures occasioned by the carbonated beverage contained in the bottle. The bottom of the bottle can be ovoidal or hemispherical in configuration to evenly distribute pressures in that end of the container. Special feet would be employed with this bottom. The center section of the bottle is prevented from substantial distortion by banding the container with a metal foil or a high strength polymer strip. A high strength cap which has substantially the same rates of expansion and contraction as the rest of the body is employed.

---

In the past carbonated beverages, which are well-known to be packaged under high pressure, have been commercially bottled exclusively in glass of metal containers. Because of the substantial rigidity and high strength of glass and metal they have been able to withstand the high pressures involved. Thermoplastic materials which are commonly used in containing products not under high pressure, such as bleach, detergents, medicines and the like, have not been commerically employed for carbonated beverages because they are only generally semi-rigid and would be subject to an excessive amount of distortion if employed with highly pressurized carbonated beverages. Accordingly, it is an object of the present invention to provide a new container for carbonated beverages which can take advantage of inexpensive thermoplastic resins which heretofore has not been possible.

Briefly, the present invention comprises a blow-molded thermoplastic container which has a rounded out bottom structure with appropriate supporting means, a high strength band around its center section and a closure which has substantially the same rate of expansion and contraction as the rest of the body of the container.

Yet additional objects and advantages of the present invention are even more apparent when taken in conjunction with the accompanying drawing in which like characters of reference designate corresponding material and parts throughout the several views thereof, in which.

Figure 1:
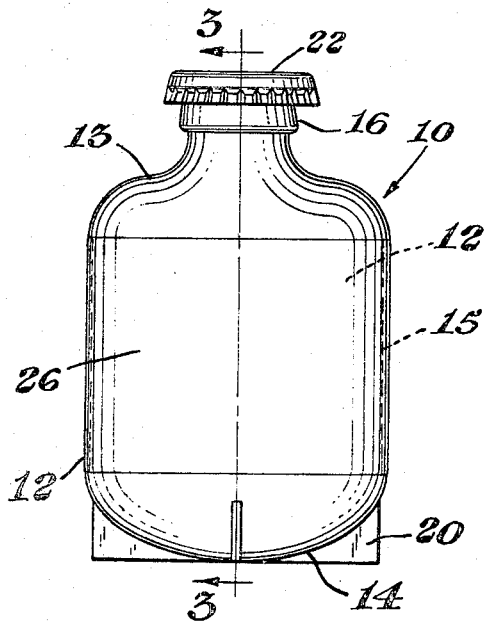
FIGURE 1 is a side elevational view of a bottle constructed according to the principles of the present invention.
Figure 3:
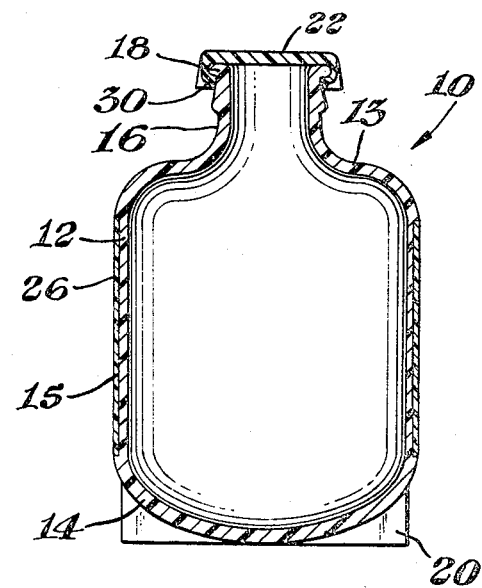
FIGURE 3 is a cross sectional view thereof taken along the reference line 3—3 of FIGURE 1.

Container 10 is a bottle or vessel which has been blow molded from a thermoplastic material, such as polystyrene, high density polyethylene, polyvinyl chloride, and the like, and can be formed following well known blow molded techniques as illustrated, for example, in U.S. Patent No. 2,579,390.

The body of the bottle 10 is comprised of substantially cylindrical side wall 12 extending upwardly from a rounded out bottom wall 14. Veering inwardly from side wall 12 is shoulder 13 which joins with neck portion 16, the latter ending at its upper periphery in a rim 18. In the embodiment shown, four feet 20 are located at ninety degrees with respect to each other about the bottom 14 to provide support for the container when it is resting on flat surfaces. A closure 22 closes the container.

The bottom 14 can be made of hemispherical ovoidal or similar rounded or semi-rounded configuration (no significant flat portions) to avoid concentration of pressures at corners and the like as would otherwise be the case if the bottle were conventionally made with a flat bottom. The feet 20 can be integrally formed as a means of holding the container upright by using the normal flash that would be present in the bottom from conventional extrusion blow molding. Two of the feet at the parting line of the mold can be trimmed from the flash. The other two feet can be formed by using a split section in the base of the mold (not shown) to form these additional feet at 90° to the parting line of the blow molded container. Of course, other means of holding the container upright could be employed, such as will be described in more detail later with respect to FIGURES 4 and 5.

The center section 12 of the bottle 10 preferably has a slightly recessed center section 15 and is prevented from substantial distortion by including banding element 26 extending entirely about the circumference of recessed center section 15 for substantially the entire height thereof. Such a band 26 can also comprise the label for the bottle by including appropriate nomenclature. This band can be an especially high strength oriented shrink polymer such as certain high shrink energy Mylar (polyethylene terephthalate) films ("Mylar" being a tradefark of the E. I. du Pont de Nemours Company), or other high shrink films, such as those described in U.S. Patent No. 3,245,-407. For example, such a band can comprise a Mylar film band from about one to two mils in thickness. The band would be in a form of a sleeve slightly larger than the diameter of the bottle 10. This band would be slipped over the recessed center section 15 of the bottle and would then be subjected to heating. Once heated, band 26 would shrink tightly onto the side wall 12 to add its strength to the strength of the side wall end therefore act to substantially resist distortion which would otherwise be caused by the high pressure occasioned by the carbonated beverage contained in the bottle. Such a band preferably would substantially resist creeping at temperatures up to about 120° F. when under pressures of up to about 125 p.s.i. Thus, while such temperatures and pressures might otherwise cause rupture of the bottle body if it were not reinforced, the band 26 prevents this from occurring.

An alternative band could comprise a steel foil or aluminum foil which is welded at its seam line and secured to the bottle by a high heat resistant polyester adhesive. As for example, a band about one or two mills in thickness of aluminum foil could be welded at its seam line and secured to the container by the use of an epoxy adhesive.

The embodiment of FIGURE 1 shows a plastic cap as closure 22. Closure 22 is tightly sealed with the rim 18 by the underside of the rim 18 being engaged by an inwardly turned peripheral flange 30 at the base of closure 22. Such a closure can be opened by use of ordinary bottle opener devices. Other plastic closures or caps which could also withstand the high pressures are shown in U.S. Patents Nos. 2,439,845 and 3,254,785, and British Patent No. 999,844. It is highly preferable that such closures be formed of the same resin as the rest of the bottle 10 for the then expansion and contraction due to temperature cycling will not cause the cap to loosen and thus permit escaping of the high pressure inside the container which might otherwise result if dissimilar rates of expansion and contraction occurred. However, it is conceivable that standard crown type metal caps commonly used for glass beverage bottles could be employed with bottle 10 where great variations in temperature cycling are not present or where the metal of the cap or its liner are generally the same rate of expansion or contraction as the plastic material employed in the bottle itself.

Figure 4:
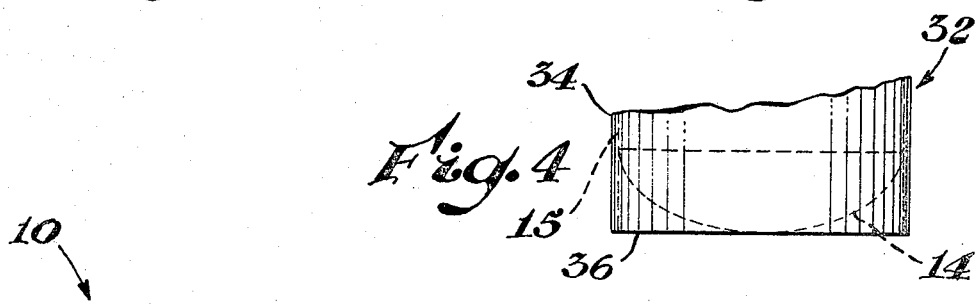
FIGURE 4 is a fragmentary side elevational view of a modified bottle constructed according to the principles of the present invention.
Figure 2:
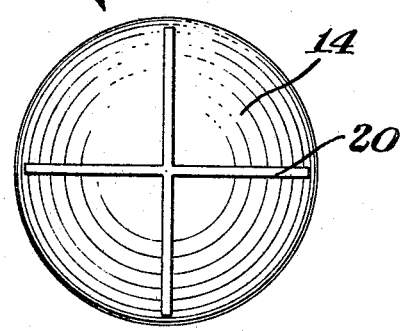
FIGURE 2 is a bottom view thereof.
Figure 5:
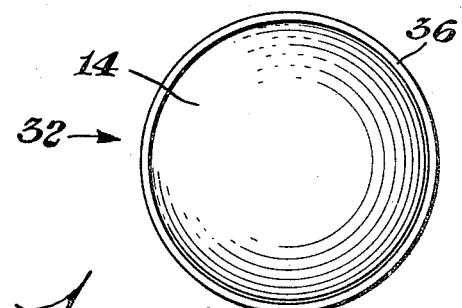
FIGURE 5 is a bottom view of the modified bottle.

Bottle 32 shown in FIGURES 4 and 5 is a modified version of bottle 10 only showing an alternate method of supporting the bottle on a flat surface. Here the bottom 14 has no feet like feet 20 for support. Instead, a band 34 (substantially like band 26 previously described) is extended downwardly to or slightly below the bottom 14, the lower periphery 36 of the band defining a plane which can rest on a flat surface. In this instance, the recessed center section 15 would extend downwardly and blend into bottom 14. The portions of bottle 32 not shown can be the same as the corresponding portions of bottle 10 previously described.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A thermoplastic pressure vessel for fluids and the like comprising a rounded-out bottom wall, a generally cylindrical side wall extending upwardly from said bottom wall and joined with a neck portion ending in a peripheral rim, a band having a tensile strength greater than said side wall, said band surrounding and fitting tightly with at least the center section of said vessel to reinforce the latter against distortion, a closure having the same general rates of expansion and contraction as said vessel and secured to said rim, and a fluid under pressure substantially greater than one atmosphere contained in said vessel.

2. The vessel of claim 1 wherein said closure is formed of a thermoplastic resin.

3. The vessel of claim 1 wherein means is provided for supporting said vessel upright on a flat surface.

4. The vessel of claim 3 wherein said means comprises a plurality of feet extending downwardly from said bottom wall.

5. The vessel of claim 3 wherein said means comprises a lower portion of said band defining a flat plane at least as low as the bottom-most extent of said bottom wall.

6. The vessel of claim 1 wherein said bottom wall is hemispherical in shape.

7. A thermoplastic pressure vessel for fluids and the like comprising a rounded-out bottom wall, a generally cylindrical side wall extending upwardly from said bottom wall and joined with a neck portion ending in a peripheral rim, a band having a tensile strength greater than said side wall, said band surrounding and fitting tightly with at least the center section of said vessel to reinforce the latter against distortion, a metal closure secured to said rim, and a fluid under a pressure substantially greater than one atmosphere contained in said vessel.

8. A thermoplastic pressure vessel for fluids and the like comprising a rounded-out bottom wall, a generally cylindrical side wall extending upwardly from said bottom wall and joined with a neck portion ending in a peripheral rim, a band having a tensile strength greater than said side wall, said band surrounding and fitting tightly with at least the center section of said vessel to reinforce the latter against distortion, said band being formed of a high shrink energy resin of from about one to two mils in thickness and covering substantially the entire height of said side wall.

9. A thermoplastic pressure vessel for fluids and the like comprising a rounded-out bottom wall, a generally cylindrical side wall extending upwardly from said bottom wall and joined with a neck portion ending in a peripheral rim, a band having a tensile strength greater than said side wall, said band surrounding and fitting tightly with at least the center section of said vessel to reinforce the latter against distortion, said band being formed of a metal foil about one to two mils in thickness and covering substantially the entire height of said side wall.

References Cited
UNITED STATES PATENTS

| | | | |
|---|---|---|---|
| 3,029,963 | 4/1962 | Evers | 215—1 |
| 3,325,030 | 6/1967 | Rausing | 215—1 |

GEORGE T. HALL, Primary Examiner

U.S. Cl. X.R.

150—.5; 215—12; 220—3, 69